United States Patent
Gans et al.

(10) Patent No.: US 10,760,791 B2
(45) Date of Patent: Sep. 1, 2020

(54) CONTROL SYSTEM FOR EXHAUST GAS FAN SYSTEM

(71) Applicant: Strobic Air Corporation, Lansdale, PA (US)

(72) Inventors: Charles Alexander Gans, Collegeville, PA (US); Paul A. Tetley, Collegeville, PA (US); Brian Jay Merritt, Conshohocken, PA (US)

(73) Assignee: Strobic Air Corporation, Lansdale, PA (US)

( * ) Notice: Subject to any disclaimer, the term of this patent is extended or adjusted under 35 U.S.C. 154(b) by 529 days.

(21) Appl. No.: 15/213,735

(22) Filed: Jul. 19, 2016

(65) Prior Publication Data
US 2016/0327292 A1 Nov. 10, 2016

Related U.S. Application Data

(63) Continuation of application No. 12/863,328, filed as application No. PCT/US2008/087572 on Dec. 19, 2008, now Pat. No. 9,423,128.
(Continued)

(51) Int. Cl.
*F23L 17/00* (2006.01)
*F24F 11/77* (2018.01)
(Continued)

(52) U.S. Cl.
CPC .......... *F23L 17/005* (2013.01); *B08B 15/002* (2013.01); *F24F 11/77* (2018.01); *F24F 13/10* (2013.01);
(Continued)

(58) Field of Classification Search
CPC .. F24F 7/025; F24F 11/72; F24F 11/77; F24F 13/26; F24F 13/10; F24F 2110/40; B08B 15/002; Y02B 30/746; F23L 17/005
See application file for complete search history.

(56) References Cited

U.S. PATENT DOCUMENTS 1,394,735 A 10/1921 Jordan
2,188,564 A 1/1940 Berg
(Continued)

FOREIGN PATENT DOCUMENTS

AU 637737 6/1993
AU 2008348110 B2 7/2013
(Continued)

OTHER PUBLICATIONS

A perfect 10, consulting specifying engineer, 2006.
(Continued)

*Primary Examiner* — Edelmira Bosques
*Assistant Examiner* — Frances F. Hamilton
(74) *Attorney, Agent, or Firm* — BakerHostetler

(57) ABSTRACT

Systems and methods for controlling an exhaust gas fan system. The control system may control one or more components of the exhaust system to optimize system performance and improve energy efficiency. The control system may be designed to maintain a substantially constant pressure in the exhaust header and provide a substantially constant flow through the exhaust fans. The control system may include software and hardware that allow the control system to control one or more of: modulation of one or more by-pass dampers; adjustment of the nozzle outlet area; varying the speed of the fans; the number and staging of fans. By utilizing and controlling one or more of these functions, the amount of energy being used may be minimized/optimized.

26 Claims, 12 Drawing Sheets

Related U.S. Application Data

(60) Provisional application No. 61/022,120, filed on Jan. 18, 2008.

(51) Int. Cl.

| | | |
|---|---|---|
| *F24F 110/40* | (2018.01) | |
| *F24F 140/00* | (2018.01) | |
| *F24F 13/10* | (2006.01) | |
| *F24F 13/26* | (2006.01) | |
| *B08B 15/00* | (2006.01) | |

(52) U.S. Cl.
CPC ........... *F24F 13/26* (2013.01); *F24F 2110/40* (2018.01); *F24F 2140/00* (2018.01); *Y02B 30/746* (2013.01)

(56) References Cited

U.S. PATENT DOCUMENTS

| | | | |
|---|---|---|---|
| 2,258,961 A | | 10/1941 | Saathoff |
| 3,722,396 A | | 3/1973 | Peill et al. |
| 4,095,514 A | | 6/1978 | Roy |
| 4,160,407 A | | 7/1979 | Duym |
| 4,204,463 A | | 5/1980 | Carty |
| 4,344,370 A | * | 8/1982 | Smith ................... F23L 17/005 110/162 |
| 4,437,608 A | | 3/1984 | Smith |
| 4,517,883 A | * | 5/1985 | Levchenko ........... B08B 15/023 454/61 |
| 4,706,553 A | * | 11/1987 | Sharp ................... B08B 15/023 454/61 |
| 4,741,257 A | * | 5/1988 | Wiggin ................. B08B 15/023 454/56 |
| 4,806,076 A | | 2/1989 | Andrews |
| 4,836,096 A | | 6/1989 | Avery |
| 4,993,314 A | | 2/1991 | Braden |
| 4,995,307 A | | 2/1991 | Floyd |
| 5,092,227 A | * | 3/1992 | Ahmed ................. B08B 15/023 454/340 |
| 5,240,455 A | | 8/1993 | Sharp |
| 5,261,389 A | | 11/1993 | Trieb |
| 5,269,660 A | * | 12/1993 | Pradelle .................... E21F 1/00 417/18 |
| 5,405,291 A | | 4/1995 | Alcom et al. |
| 5,439,349 A | | 8/1995 | Kupferberg |
| 5,439,414 A | | 8/1995 | Jacob |
| 5,538,471 A | | 7/1996 | Guiles, Jr. |
| 5,554,416 A | | 9/1996 | Scheufler et al. |
| 5,586,932 A | | 12/1996 | Kiser |
| 5,820,456 A | | 10/1998 | Nelson |
| 5,823,004 A | * | 10/1998 | Polley ..................... F24F 11/77 62/179 |
| 6,071,188 A | | 6/2000 | O'Neill et al. |
| 6,112,850 A | | 9/2000 | Secrest et al. |
| 6,154,686 A | * | 11/2000 | Hefferen ............... B08B 15/023 454/59 |
| 6,227,961 B1 | * | 5/2001 | Moore ................... F04D 27/004 454/229 |
| 6,431,974 B1 | | 8/2002 | Tetley et al. |
| 6,463,891 B2 | * | 10/2002 | Algrain ..................... F01P 3/18 123/41.12 |
| 6,520,848 B1 | | 2/2003 | Grant |
| 6,669,547 B2 | * | 12/2003 | Liu ....................... B08B 15/002 454/61 |
| 6,715,690 B2 | * | 4/2004 | Hull ......................... F24F 13/08 236/49.3 |
| 6,890,252 B2 | | 5/2005 | Liu |
| 7,018,287 B2 | | 3/2006 | Kupferberg et al. |
| 7,077,739 B2 | * | 7/2006 | Kupferberg ........... F23L 17/005 454/1 |
| 7,241,214 B2 | | 7/2007 | Sixsmith |
| 7,320,636 B2 | * | 1/2008 | Seliger ................. B08B 15/002 126/299 F |
| 7,484,929 B1 | | 2/2009 | Fitzpatrick |
| 7,891,573 B2 | * | 2/2011 | Finkam .................... F24F 11/74 236/49.3 |
| 8,672,614 B1 | | 3/2014 | Fitzpatrick |
| 9,372,009 B2 | * | 6/2016 | Coogan ................. F24F 11/0001 |
| 2003/0104778 A1 | * | 6/2003 | Liu ....................... B08B 15/002 454/61 |
| 2003/0171092 A1 | | 9/2003 | Karamanos et al. |
| 2003/0207662 A1 | | 11/2003 | Liu |
| 2005/0159101 A1 | | 7/2005 | Hrinda et al. |
| 2005/0170767 A1 | * | 8/2005 | Enzenroth ............. B08B 15/002 454/36 |
| 2005/0204582 A1 | * | 9/2005 | Rossi .................... B08B 15/002 34/551 |
| 2006/0217055 A1 | * | 9/2006 | Kupferberg .......... F24F 11/0001 454/184 |
| 2007/0026786 A1 | * | 2/2007 | Liu ............................ F23J 11/02 454/61 |
| 2007/0205297 A1 | * | 9/2007 | Finkam .................... F24F 11/74 236/1 C |
| 2007/0298700 A1 | * | 12/2007 | Datta ....................... E04F 17/02 454/1 |
| 2008/0139105 A1 | * | 6/2008 | Kuentz .................... F24F 11/77 454/238 |
| 2008/0274686 A1 | | 11/2008 | Kupferberg et al. |
| 2009/0191803 A1 | | 7/2009 | Barrette et al. |
| 2010/0291849 A1 | | 11/2010 | Enzenroth et al. |
| 2010/0291850 A1 | | 11/2010 | Sabbaghian et al. |
| 2013/0315729 A1 | | 11/2013 | Gans |

FOREIGN PATENT DOCUMENTS

| | | | |
|---|---|---|---|
| EP | 0667495 | 8/1995 | |
| GB | 2318867 | 5/1998 | |
| JP | S6259326 A | 3/1987 | |
| JP | 11325526 | 11/1999 | |
| KR | 20030091401 A | * 12/2003 | |
| KR | 20030091401 A | * 12/2003 | .............. F24F 11/00 |
| WO | WO 93/13881 | 7/1993 | |
| WO | WO 95/13146 | 5/1995 | |
| WO | WO 2009/091477 | 7/2009 | |

OTHER PUBLICATIONS

M.K. Plastics corporation, High Plume Exhaust Solutions, Mar. 2010.

Exhausting Considerations, pollution engineering, Mar. 2006.

* cited by examiner

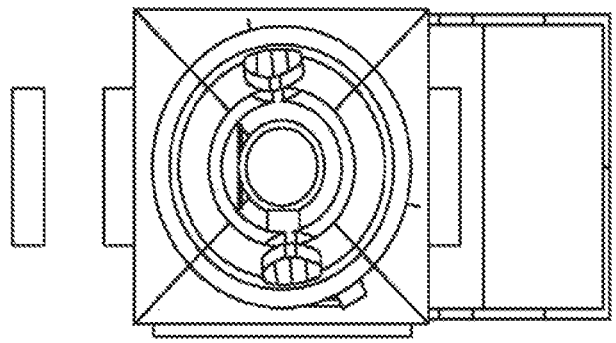
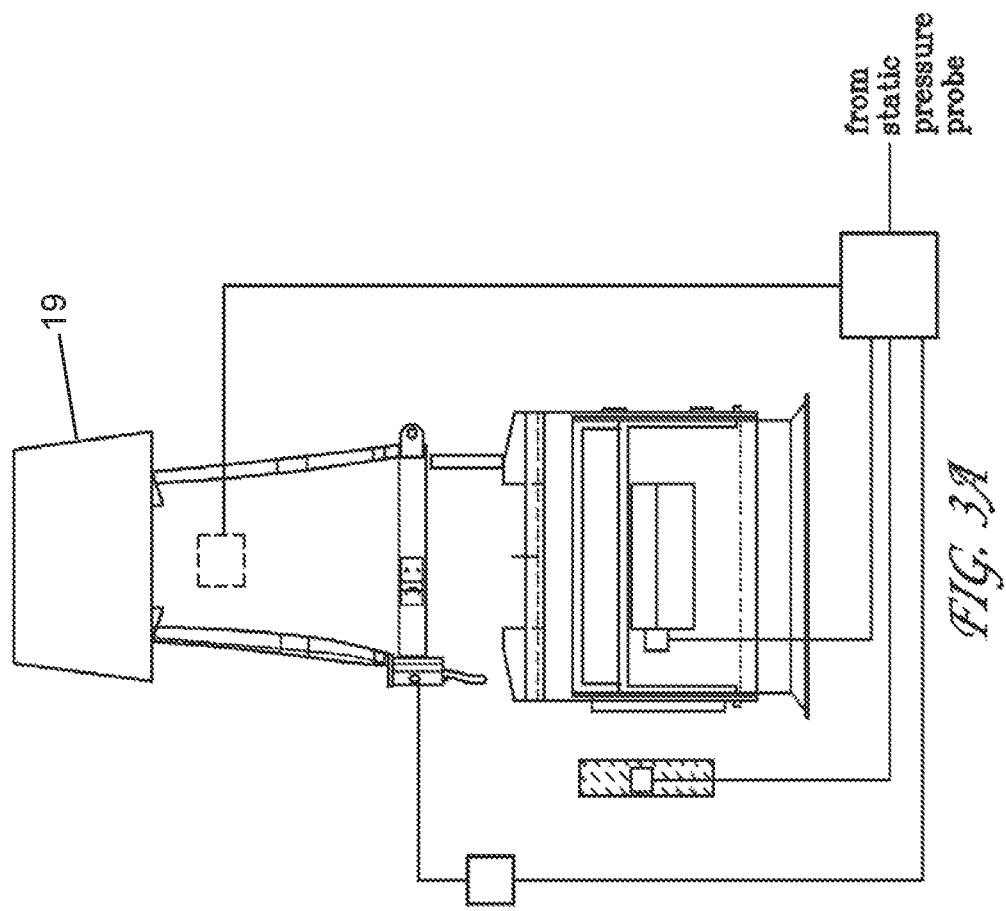

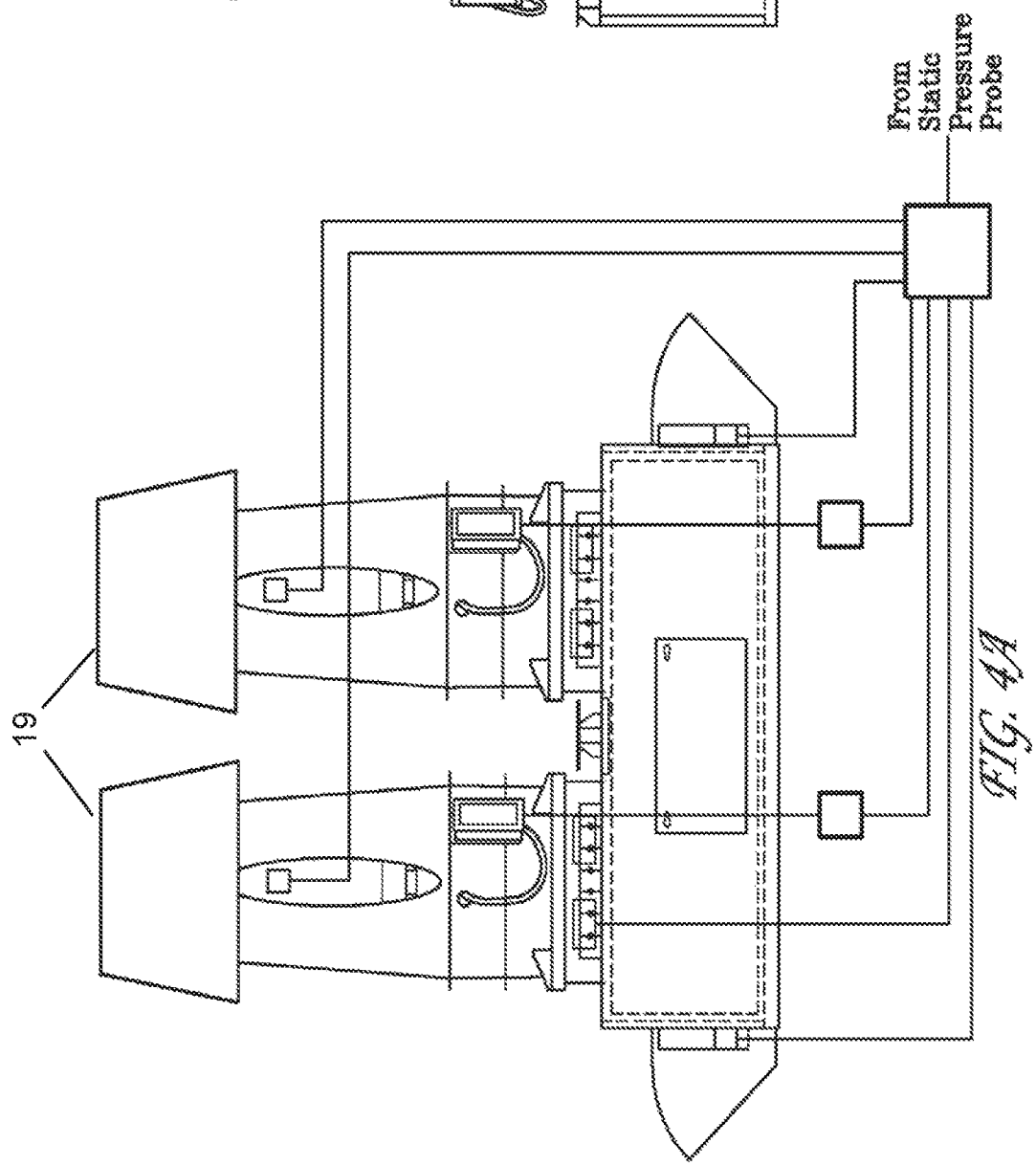

CONTROL SYSTEM FOR EXHAUST GAS FAN SYSTEM

CROSS REFERENCE TO RELATED APPLICATIONS

This application is a continuation of U.S. application Ser. No. 12/863,328, filed Sep. 21, 2010, which is the National Stage of International Application No. PCT/US2008/087572, filed Dec. 19, 2008, which claims the benefit of U.S. Provisional Application No. 61/022,120, filed Jan. 18, 2008, the disclosures of each of which are incorporated herein by reference in their entireties.

TECHNOLOGY FIELD

The present invention relates to building exhaust systems. More particularly, the present invention relates to control systems and methods for controlling gas exhaust fans to exhaust gas from the interior of a building.

BACKGROUND

The lifeline of every building ventilation system is the exhaust system. The improper selection, application, installation, operation, and/or control of the exhaust gas system can cause poor system performance. This can lead to unsafe recirculation of fumes and exhaust gases, excessive noise, premature maintenance, fan failure, and wasted energy.

Conventional gas exhaust systems typically have a fan and a nozzle, or a fan and a stack device for pulling gas out of the interior of a building and then conveying the exhaust gas above the roof turbulence region. This may be accomplished by increasing the velocity of the exiting air in order to properly dispel the air or using a tall stack, both of which serve to avoid re-entrainment of the discharged exhaust gas.

In this regard, reference is made to U.S. Pat. No. 6,431,974, issued to Tetley et al., U.S. Pat. No. 4,806,076, issued to Andrews, and U.S. Pat. No. 5,439,349, issued to Kupferberg, which are designed to provide a high velocity jet for exhausting atmosphere and other gases. These exhaust fans are typically mounted on the roof areas of buildings and are used to carry exhaust gases as high as possible above the roof line of the building so as to ensure an effective final dilution of the gases within the greatest possible volume of ambient air and to ensure their dispersal over a large area with maximum dilution.

For example, the radial upblast exhaust fan apparatus described and shown in U.S. Pat. No. 4,806,076 has a nozzle in which two converging flow paths are defined by two respective passageways. A fan is positioned within the fan housing to urge exhaust gases to flow upwardly through the exhaust paths. A passive zone located between the two flow paths supplies environmental air for mixing by induction into the contaminated gases being exhausted through the converging flow paths.

These conventional systems exhaust the air away from building intakes or any other areas that could lead to re-entrainment of the discharged exhaust gas and to people inhaling the exhaust. The common range for velocity discharge from a stack is 1,000-3,000 fpm. The ANSI standard for these fans is to maintain 3000 fpm at the discharge of the fan.

Thus, in view of the foregoing, there is a need for control systems for exhaust gas fan systems that ensure proper system performance and provide efficient and safe operation. Embodiments of the present invention provide such control systems and methods.

SUMMARY

The following is a simplified summary of the invention in order to provide a basic understanding of some of the aspects of the invention. This summary is not intended to identify key or critical elements of the invention or to define the scope of the invention.

In accordance with the present invention a control system is provided for exhaust gas systems of the type described above. The control system may be mounted directly on to the fan plenum so that it can operate one or more of: by-pass damper actuators, stage the fans on multiple fan systems, control the fan drive systems, adjust discharge nozzles, determine the static pressure in the exhaust system, and determine the air flow through the fan. The control system may control one or more of the above exhaust system components in order to maintain a minimum gas exhaust through the exhaust fan while still maintain a minimum discharge velocity to ensure proper operation of the exhaust system. This helps to conserve energy.

According to one aspect of the invention, the control system maintains the by-pass damper closed when gas flow is above a certain minimum and otherwise opens the by-pass damper to maintain gas exhaust above the minimum. A constant static pressure may be maintained in the exhaust system header by modulating the by-pass damper. By keeping the by-pass damper closed except when it is necessary to open the by-pass damper in order to correctly control airflow, considerable savings in energy may be obtained. In other embodiments, the by-pass damper may be eliminated altogether.

According to yet another aspect of the invention, the controller controls a plurality of variable speed fans mounted on a common plenum in a multiple fan system. A adjustable speed fan drive (VSD or VFD) may be provided for each of the fans. The fan speed may be adjusted between a pre-set minimum and a pre-set maximum speed for the fans. When multiple fans are energized, the control system preferably balances the load (e.g., flow rate) substantially equally between the fans.

According to one aspect of the invention, adjustable nozzles may be used to maintain a constant pressure in the exhaust system header. An actuator may be used to change the position of a portion of the outlet nozzle thereby adjusting the nozzle outlet area. Decreasing the nozzle outlet area decreases the flow and increases the velocity of the exhaust air exiting the nozzle. Increasing the nozzle outlet area increases the flow and decreases the velocity of the exhaust air.

According to another aspect of the invention, the control system is designed to maintain a minimum pre-determined discharge velocity. This minimum point would be determined with the intent to avoid stack downwash and possible re-entrainment conditions.

According to another aspect of the invention, in cases where the building airflow demand could drop below the level needed to maintain the set velocity, the fan(s) may be mounted on a mixing plenum with by-pass or bleed-in dampers. The control system would modulate these dampers to "make-up" the additional air needed to maintain the set velocity through the exhaust fan.

According to one embodiment, a single exhaust fan is provided and the control system controls one or more of: by-pass dampers, fan speed, and adjustable outlet nozzles to maintain system set point. The exhaust gas fan system may include and the control system may control any one component, sub-combination of components, or all components listed above.

According to another embodiment, multiple exhaust fans are provided and the control system controls one or more of: by-pass dampers, fan speed, the number and staging of fans, and adjustable outlet nozzles to maintain system set point. The control system may also control the operation of isolation dampers. When an exhaust fan is de-energized, the isolation damper is closed. When an exhaust fan is energized, the isolation damper is opened. The exhaust gas fan system may include and the control system may control any one component, sub-combination of components, or all components listed above.

According to another aspect of the invention, at least three fans are mounted on a common plenum. At least one fan is operating and at least one fan is in a standby mode. One of the fans may comprise a redundant fan. In case of failure of one of the fans, the control system may energize a redundant fan for exhaust safety. The controls may provide for cycling and sequencing of the fans.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. Included in the drawing are the following Figures:

FIGS. 3A and 3B show an exemplary exhaust fan that may be mounted on a roof of a building;

FIGS. 4A and 4B show an exemplary exhaust fan system having two exhaust fans;

DETAILED DESCRIPTION OF ILLUSTRATIVE EMBODIMENTS

Embodiments of the present invention are directed to systems and methods for controlling an exhaust gas fan system. The control system may monitor the static pressure of the exhaust system and control one or more components of the exhaust system to optimize system performance and imp rove energy efficiency. The control system may be designed to maintain a substantially constant pressure in the exhaust header and provide a substantially constant flow through the exhaust fans (e.g., a substantially constant volume and discharge velocity). At the same time, the control system may be designed to ensure proper dilution of the exhaust air and to generate an exhaust plume having a velocity sufficient to ensure the exhaust air is not re-introduced into the building intake.

Embodiments of the present invention tie the control system together with one or more components of the exhaust gas fan system to optimize system performance and provide energy savings. The control system may include software and hardware that allow the control system to monitor and maintain a constant static pressure in the exhaust system by controlling one or more exhaust system components. The control system may accomplish this by controlling one or more of: modulation of one or more by-pass dampers; adjustment of the nozzle outlet area; varying the speed of the fans; staging of fans; and the like. By utilizing and controlling one or more of these functions, the amount of energy being used may be minimized/optimized. For example, reduced horsepower may be required due to one or more of staging of fans, variable speed drives, minimizing/eliminating by-pass flow, and/or adjustment of outlet nozzles area.

Implementation and use of the features such as: staging of fans on multiple fan systems, variable fan speed, and adjustable outlet nozzles; may reduce and/or eliminate the need for use of a by-pass damper, providing improved efficiencies and energy savings. Although conventional exhaust systems may have addressed one of these features in isolation, conventional systems do not include the combination and integration of the various control functions.

Also, certain large facilities may have an exhaust load such that at least one exhaust fan is required at all times. As such, the exhaust system may not need a by-pass, but rather may employ a control system having one or more of: staged fans, adjustable speed fans, and adjustable outlet nozzles. These features may provide an ability to adjust and fine tune the exhaust system with or without the need for by-pass.

Preferably, the control system is self-reliant, meaning that the control system need not be tied into the building system. Preferably, the control system is intelligent, meaning that it includes logic for responding to a sensed exhaust system parameter and controlling one or more components of the exhaust gas system to maintain system set point.

Figure 1:
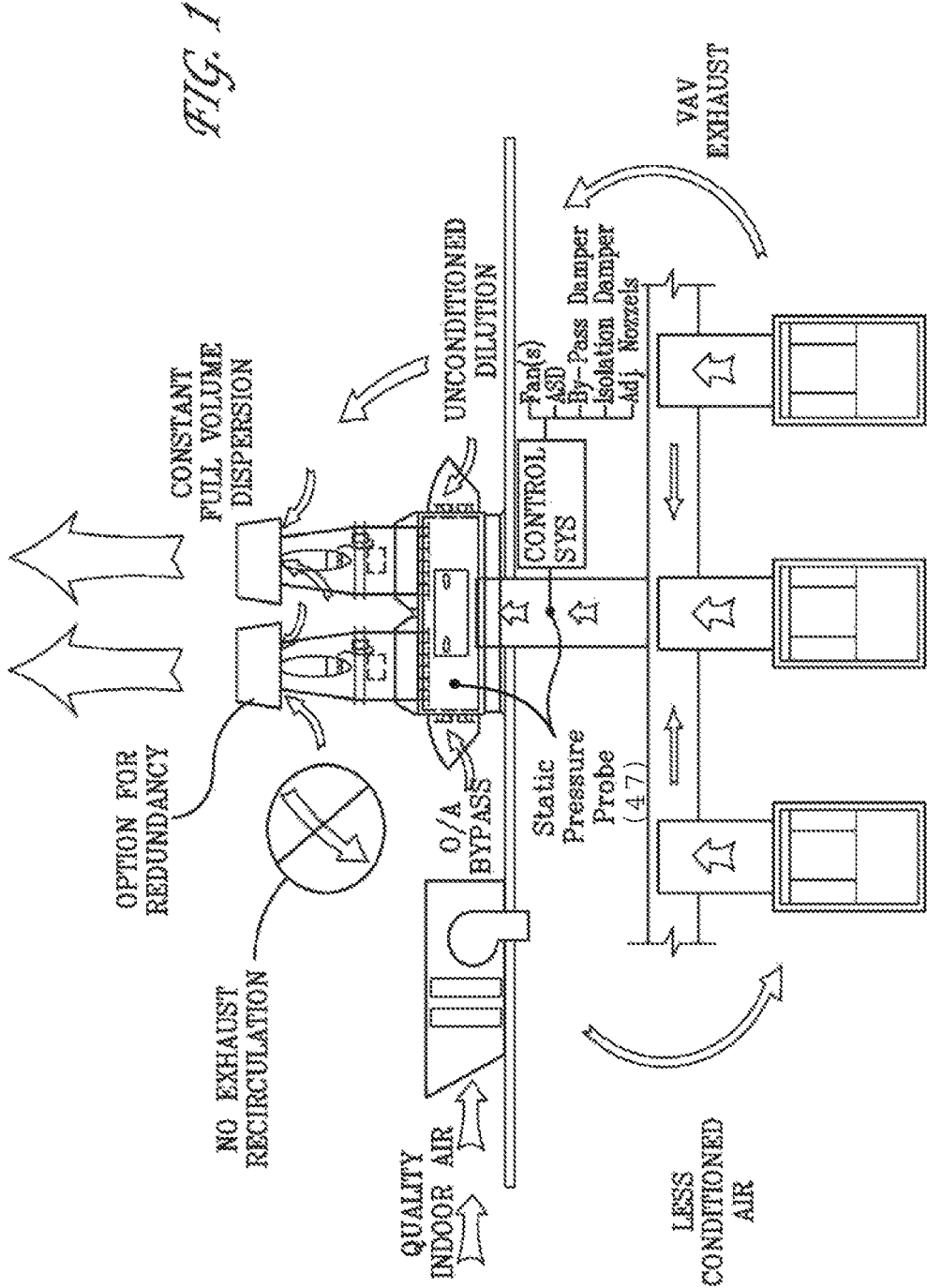
FIG. 1 shows an exemplary building exhaust gas fan system.

FIG. 1 shows an exemplary building exhaust gas fan system for exhausting air (gas and fumes) from a building. As shown in FIG. 1, the building exhaust gas fan system includes exhaust fans mounted on the roof of the building. During operation, building exhaust is drawn into the exhaust ducting through one or more exhaust hoods located at various locations within the building being served by the exhaust gas fan system. The exhaust ducting may include a plurality of branches, for example, each branch serving a different location, wing, room, lab, etc. within the building. As the exhaust is drawn upward by the exhaust fans, the branches combine into common branches and eventually into a common duct (also referred to as a trunk duct or riser). The common duct may be in fluid communication with a plenum.

A static pressure probe 47 may be installed in the common duct and/or plenum to monitor the static pressure of the exhaust. The exhaust gas fan system may operate to maintain a constant static pressure in the header (i.e., the common header and plenum). The system may include one or more by-pass dampers mounted on the plenum to allow dilution of the exhaust with atmospheric air and/or to improve the performance of the exhaust fan(s). Actuators may be provided for positioning the by-pass dampers. Pressure changes in the plenum (or common duct) caused by hood demand may be sensed by the static pressure probe and used by the control system to cause the by-pass dampers to modulate, for example using an actuator, to maintain set point.

As shown in FIG. 1, one or more exhaust fans are in fluid communication with the plenum. Also as shown, the exhaust fans include a fan housing, an impeller assembly, and a motor. Suitable fan types may include: mixed flow, centrifugal, axial, radial, and the like. The motor size may be selected to meet precise airflow and pressure requirements of the particular exhaust system. The exhaust fans may also include an Adjustable Speed Drive (ASD). The ASD may include a Variable Speed Drive (VSD) or a Variable Frequency Drive (VFD). Pressure changes in the plenum (or common duct) caused by hood demand may be used by the control system to send a signal to the fan drive to adjust the fan speed to maintain set point. In multiple fan systems, the control system may also stage fans in order to maintain system pressure.

The exhaust fans may have a side inlet or a bottom inlet. As shown, the exhaust fans include a bottom inlet and are mounted on top of the plenum. The exhaust fan may include an isolation damper. The isolation damper may be controlled by an actuator to close off de-energized fans in a multiple fan system. This prevents atmospheric air from being drawn in reverse through a de-energized fan and windmilling of off-line fans.

Operation of the exhaust fan(s) draws the exhaust from the plenum and discharges the exhaust into a nozzle located downstream of the exhaust fan. The outlet nozzle may include an adjustable outlet nozzle. The position, and hence flow through area, of the outlet nozzles may be adjusted by the control system in response to hood demand to maintain set point.

Optionally, a wind band (i.e., one or more annular sections disposed concentrically over and about the fan discharge in a space relationship) may be used to induce atmospheric air to combine with the exhaust air passing out of the nozzle area for dilution and/or increasing the mass flow rate of the discharging exhaust.

Exhaust systems typically require that the exhaust be discharged a sufficient height above the building to ensure proper dispersion of the exhaust and to prevent re-entrainment of exhaust into the building intake. This may be accomplish using conventional stacks, which are unsightly, or a fan having outlet nozzles to increase the velocity of the exiting exhaust and provide an effective stack height sufficient to meet system design requirements. As shown in FIG. 1, the exhaust fan plume may be discharged upward as a constant, full volume dispersion. Proper operation of the exhaust gas fan system should ensure the there is no exhaust recirculation.

A shown in FIG. 1, a static pressure probe may be installed in the common duct and/or plenum to monitor the static pressure of the exhaust. The control system may receive a signal from the static pressure probe. In an effort to maintain a substantially constant system pressure set point, the control system: may send a signal to, for example, an electric actuator which modulates the by-pass damper; may send a signal to the fan drive to adjust the speed of the fan; may send a signal to the adjustable nozzles to adjust the position of the nozzles. Each of these control functions may be used individually, or in various combinations, to maintain a substantially constant static pressure within the exhaust header, and hence substantially constant flow through the exhaust fans, in order to optimize exhaust system performance and efficiency.

Preferably, the control system logic is set to optimize system performance and improve energy efficiency. Energy saving actions my include, for example: using the minimum number of fans; operating the fan(s) at minimum speed; eliminating and/or minimizing the use of by-pass; etc.

Figure 2A:
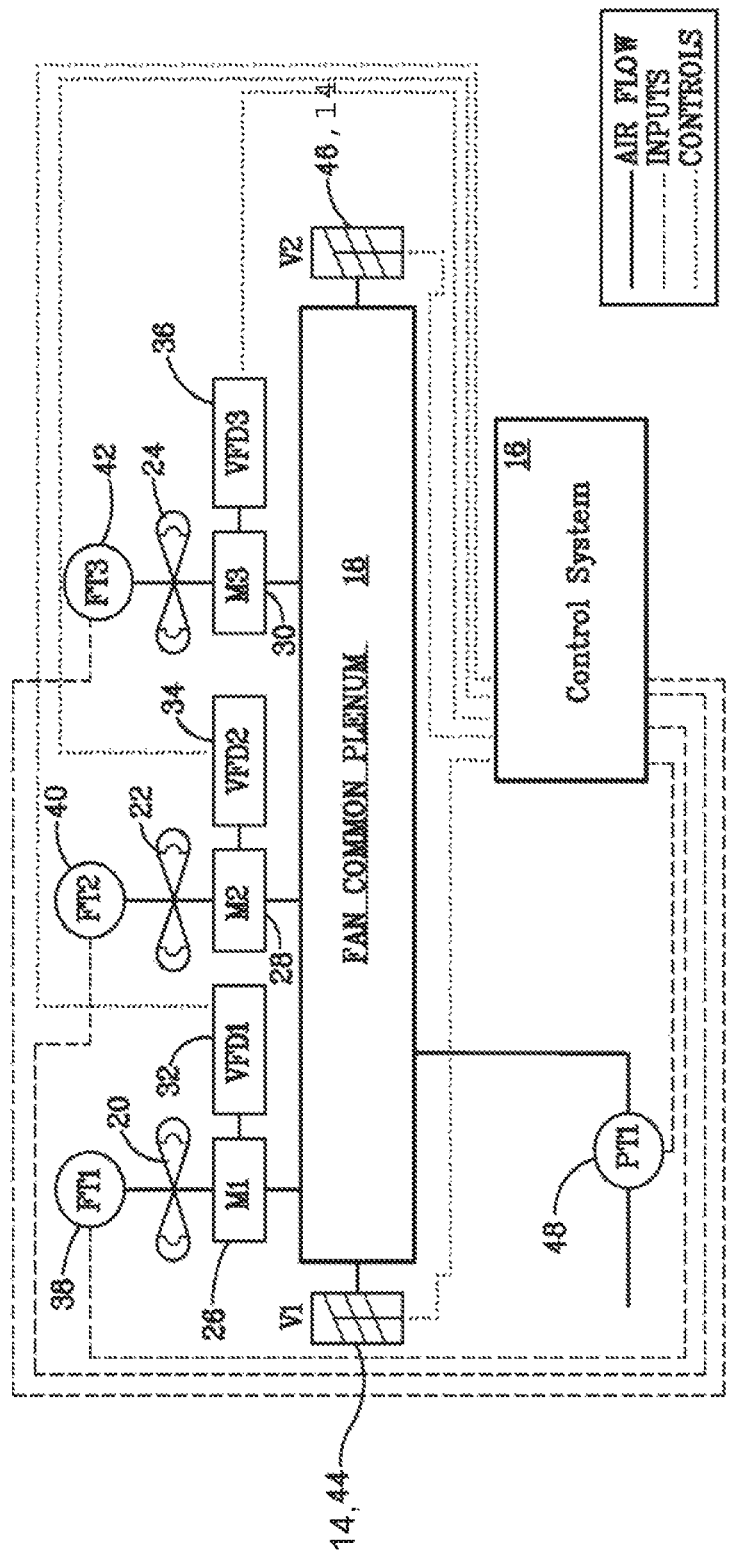
FIG. 2A shows an exemplary exhaust gas fan system having a control system in accordance with an embodiment of the invention and having a pressure sensor, by-pass dampers and adjustable speed drives.

FIG. 2A shows an exemplary exhaust gas fan system having a control system for controlling multiple exhaust fans and includes by-pass dampers and adjustable speed drives (ASD). The control system 16 may normally maintain by-pass damper 14 closed to conserve energy. Otherwise, control system 16 may open the by-pass damper to maintain gas exhaust above the minimum required level. Control system 16 may be mounted directly on the common plenum 18. The fan motors 26, 28, 30 may be controlled by variable frequency drives (VFD's) 32, 34, 36. The VFD drive may add a considerable amount of energy savings by reducing/eliminating the need for by-pass air while the fan is exhausting at velocities above a set minimum discharge velocity (e.g., 3000 fpm). The minimum discharge velocity may be manually set in the VFD as a minimum frequency, or a flow station (not shown) can be mounted within the fan inlet bell, or a piezometer may be mounted on the inlet bell.

Flow transducers 38, 40, 42 may be used to determine airflow through the duct work. These sensors may be tied to control system 16, which maintains a constant airflow through the fan. A pressure transducer 48 (e.g., a static pressure probe) may be used to monitor the static pressure in the exhaust system. Actuators 44 and 46 may control the opening and closing of the by-pass damper. The control system 16 may operate these actuators to maintain a constant static pressure within the building ductwork.

Figure 2B:
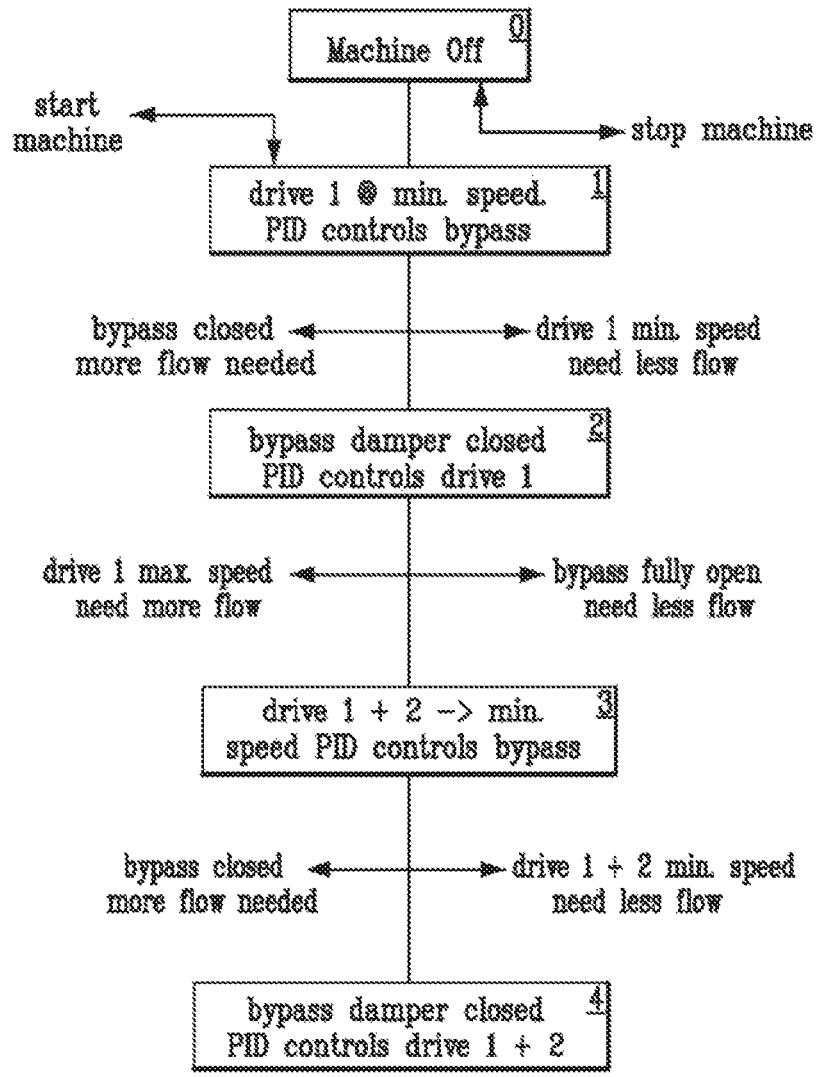
FIG. 2B is flow diagram illustrating the logic of an exemplary control system for controlling the building exhaust gas fan system of FIG. 2A.

FIG. 2B is a flow chart illustrating the logic of an exemplary control system that may be used with an exhaust gas fan system having one or more exhaust fans. In this embodiment, the control system monitors the building system static pressure and may control the number of exhaust fans, the speed of the exhaust fans, and/or the operation of the by-pass dampers. As shown in FIG. 2B, the control system provides for starting and stopping of each exhaust fan.

When the building exhaust fan system is placed in operation, a first exhaust fan may be started/energized, its isolation damper opens, and the drive of the first exhaust fan may be set at a minimum speed. If multiple fans are included, the other fans may be off or in a stand-by mode. Any de-energized fan will have its isolation damper closed. With low demand (i.e., low cfm demand) from the hoods, one fan may be used and the by-pass dampers may be open to provide more flow to the fan. As hood demand increases, the control system may cause the by-pass dampers to close. As the by-pass dampers approach full closure and/or are at full closure (or reaches some other pre-determined point), and as the exhaust load in the building continues to increase, the control system may increase the speed of the first exhaust fan to provide more flow.

As the first exhaust fan approaches and/or is at a pre-set maximum speed (or reaches some other pre-determined point), a second exhaust fan may be energized. With two exhaust fans in operation, less flow may be required and the exhaust fans may be set to a minimum speed and the by-pass dampers may open to hold the desired set point. As hood demand continues to increases, the control system may cause the by-pass dampers to close. As the by-pass dampers approach full closure and/or are at full closure, and as the exhaust load in the building continues to increase, the control system may increase the speed of the first and second exhaust fans to provide more flow. When multiple exhaust fans are in operation, the control system preferably balances the load (e.g., flow rate) between the exhaust fans.

With decreasing system demand, the control system may reverse the order of the control logic. Referring to FIG. 2B, the fan speed may be decreased until the fans reached a minimum speed. With continued decreasing system demand, the control system would begin to open the by-pass to increase by-pass flow to the fans. Once the by-pass is fully open, and with continued decreasing demand, the control system may de-energize one of the fans since less flow is needed. The isolation damper for the de-energized fan may be closed. The speed of the remaining fan may be adjusted to maintain set-point. Once the fan is at minimum speed, the by-pass damper may be open to increase by-pass flow to the fans. Again, at all times the control system maintains a constant system pressure and ensures that the outlet velocity of the exhaust system does not fall below safety/design requirements.

By properly controlling the operation of one or more of: the by-pass dampers position; the fan drive speed; and adjustable nozzle position in order to properly maintain a constant system pressure and proper control airflow through the system, considerable savings in motor brake horsepower may be achieved.

FIGS. 3A and 3B show an exemplary exhaust gas fan system comprising a single exhaust fan. As shown in FIGS. 3A and 3B, the exhaust fan is mounted on top of a plenum. The plenum includes an inlet for receiving exhaust air. An isolation damper may be provided to cover the plenum inlet. The exhaust fan also includes a fan assembly, a nozzle and a outlet. Optionally, and as shown in FIGS. 3A and 3B, the exhaust fan may include a wind band.

FIGS. 4A and 4B show an exemplary exhaust gas fan system comprising multiple exhaust fans. As shown in FIGS. 4A and 4B, two exhaust fans are mounted on top of a plenum. One or more by-pass dampers may be provided on the plenum. A by-pass damper actuator may be used to control the operation of each by-pass damper. A rain cover may be provided for each by-pass damper. An isolation damper may be provided between the plenum and each exhaust fan. An isolation damper actuator may be used to control the operation of each isolation damper. The isolation damper improves system performance by reducing/preventing outside air from being drawn into the operating exhaust fan through a non-operating exhaust fan.

As shown in FIGS. 4A and 4B, the exhaust fans include a fan housing, a motor, and disconnect switch. A nozzle is provide downstream of the fan to increase the velocity of the discharging exhaust and to produce a converging high velocity plume. An optional entrainment wind band is also shown.

Figure 5B:
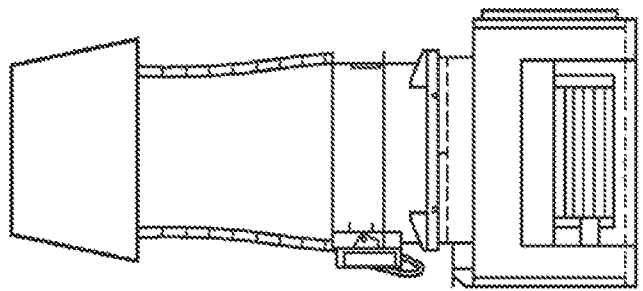
FIGS. 5A and 5B show an exemplary exhaust fan system having three exhaust fans.
Figure 5A:
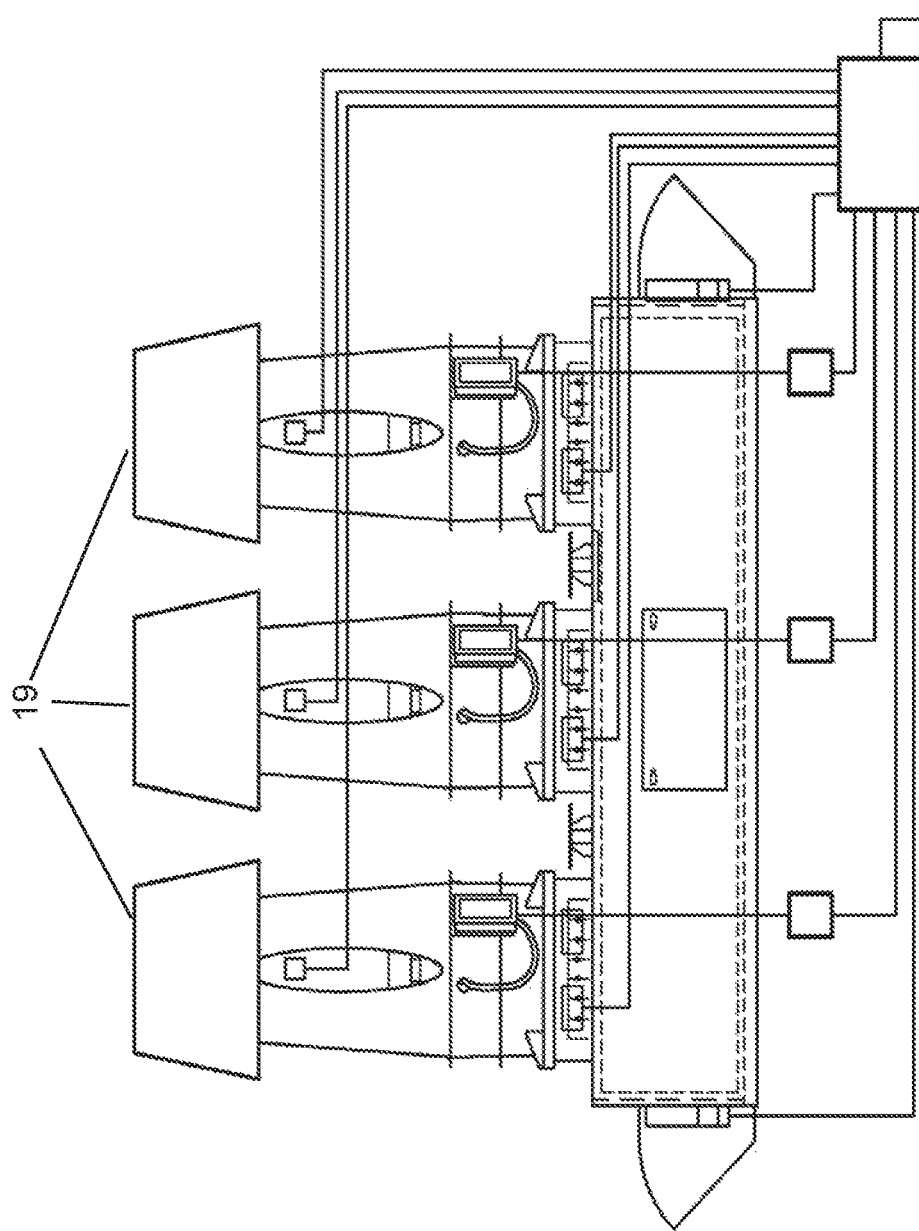

FIGS. 5A and 5B show another multiple exhaust fan embodiment comprising three exhaust fans mounted on top of a plenum. One or more by-pass dampers may be provided on the plenum. A by-pass damper actuator may be used to control the operation of each by-pass damper. A rain cover may be provided for each by-pass damper. An isolation damper may be provided between the plenum and each exhaust fan. An isolation damper actuator may be used to control the operation of each isolation damper.

Again, the exhaust fans include a fan housing, a motor, and disconnect switch. A nozzle may be provided downstream of each fan to increase the velocity of the discharging exhaust and to produce a converging high velocity plume. An optional entrainment wind band is also shown mounted on each exhaust fan.

In embodiments employing multiple exhaust fans, a backup/redundant fan may be utilized. In such an embodiment, at least three exhaust fans will by installed (see FIGS. 5A and 5B). The control system logic may include provisions for periodically cycling which of the exhaust fans is the backup/redundant fan. This cycling or sequencing of exhaust fans should ensure that all the exhaust fans have substantially the same number of hours of operation. In addition, the control system logic should include provisions for operating the backup/redundant fan in case of failure of any one fan.

Figure 6:
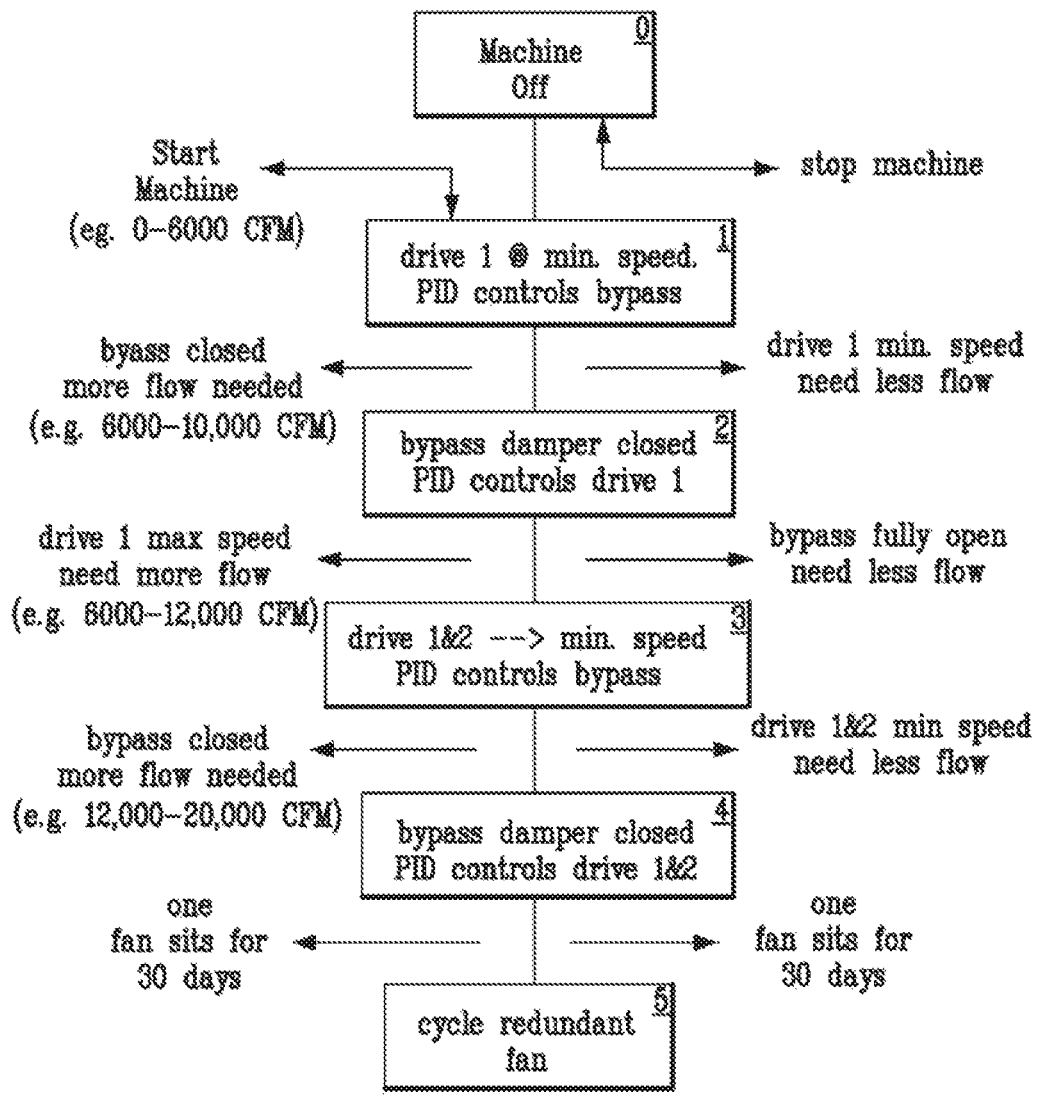
FIG. 6 is flow diagram illustrating the logic of an exemplary control system incorporating a redundant exhaust fan.

FIG. 6 is a flow chart illustrating the further logic of an exemplary control system for cycling or sequencing of the exhaust fans. As with the embodiment described with respect to FIG. 2, this embodiment includes a control system that monitor the building system static pressure and may control one or more of: modulation of the by-pass dampers, the variable speed of the exhaust fans, and/or the number of exhaust fans in operation. As shown in FIG. 6, the control system may further include logic for cycling or sequencing of exhaust fans in an exhaust gas fan system having multiple exhaust fans. Further, in embodiments having three or more exhaust fans, the control system logic may provide control for operating one of the exhaust fans as a back-up/redundant fan. The exhaust fan designated as the redundant fan may be cycled by the control system among the fans. It is preferred that the cycling/sequencing of multiple fans be varied so that all fans operate approximately equal hours. Also, it is preferred that no fan remain idle for an extended period of time. Having a redundant fan helps to prolong the life of the fans by distributing the operating hours over a greater number of fans.

As described with respect to FIGS. 2B and 6, one or more by-pass dampers may be employed. During periods of low system demand, the exhaust fans need to have supplemental air coming in. This may be accomplished via by-pass air being drawn from atmospheric air. Preferably, the exhaust fans are maintained at a pre-determined minimum speed to prevent the exhaust from coming back down onto the rooftop and being re-entered back into the building intakes. By-pass air serves the purpose of helping to maintain the plume at a sufficient velocity during periods of low demand. In other words, instead of slowing the fans down to a speed where the plume may fall back down onto the rooftop, a by-pass damper may be opened up to provide makeup air. The control system may monitor and maintain the static pressure in the building, even though the exhaust hoods may be closed and the exhaust system may be drawing supplemental air through the by-pass damper.

As the building's exhaust load increase, the exhaust hoods start opening. As a result, more air needs to be flowing through the system and the by-pass dampers start to close. Use of by-pass is inefficient, and if possible, it is generally desirable to minimize or eliminate the use of by-pass air. Use of a control system including one or more of: staging of fans, variable speed drive, adjustable outlet nozzles, with or without by-pass modulation, serves the purpose of enhances system performance and provides energy savings.

Figure 7:
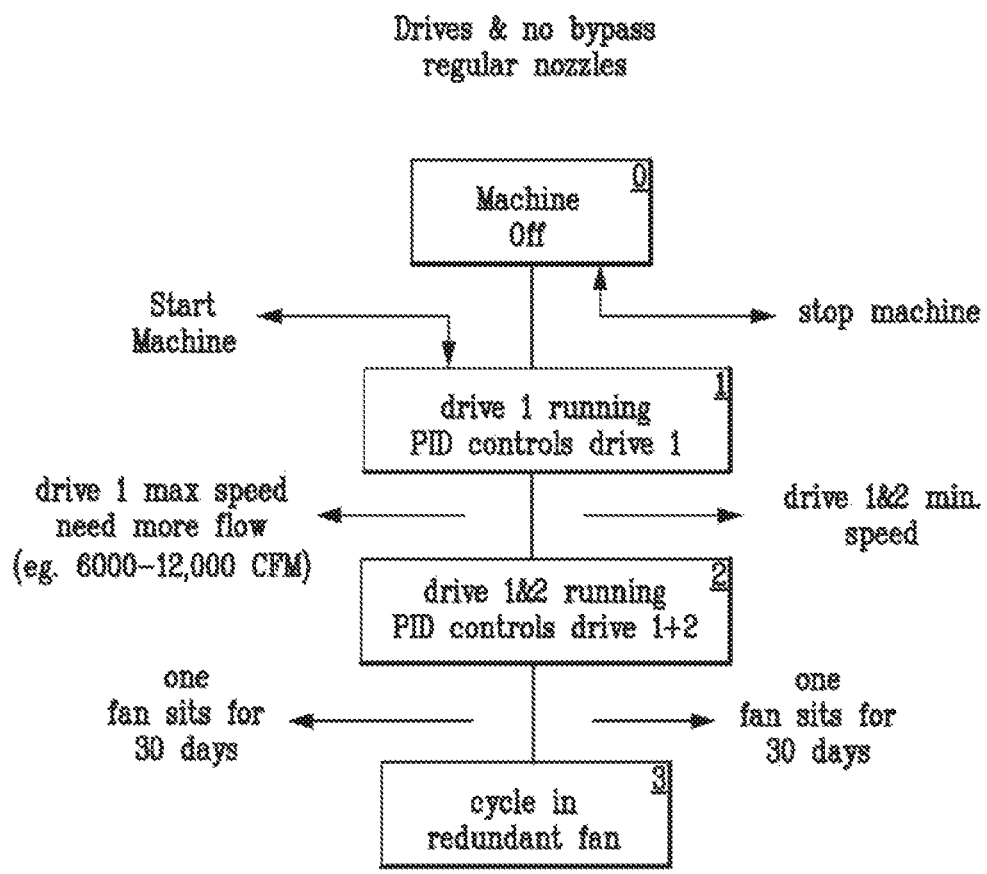
FIG. 7 is flow diagram illustrating the logic of an exemplary control system incorporating variable speed drive into the exhaust fan system.

FIG. 7 is a flow chart illustrating another embodiment of the control system for a multiple fan system. The control system includes Adjustable Speed Drives (ASD) and the exhaust gas system does not include by-pass dampers and has non-adjustable outlet nozzles. Use of ASD helps to minimize electrical energy consumed by the fans. The ASD may receive inputs from the pressure and/or flow transducers. ASD also help to prolong the life of the fans by operating the fans at a minimum speed necessary to meet system demand.

As shown in FIG. 7, the control includes start/stop logic. At start-up, a first exhaust fan is energized and the control system controls the fan drive. With low system demand, the control system sets the fan speed to a pre-set minimum speed. As hood demand increases, the static press probe in the exhaust header senses low system pressure and the control system may respond by sending a signal to the fan drive to increase the fan speed.

Once the fan reaches a pre-set maximum speed, and with increasing system demand, the control system may start a second exhaust fan. The load is balanced between the energized fans and the fan drives (fan drive 1 and fan drive 2) may be set to the pre-set minimum speed. As system demand continues to increase, the control system may increase the speed of the two fans. If the fans reaches a pre-set maximum speed, and with increasing system demand, the control system may start a third exhaust fan. The load may be balanced between the energized fans and the fan drives (fan drive 1, fan drive 2, fan drive 3) may be set to the pre-set minimum speed. As system demand continues to increase, the control system may increase the speed of the three fans. This process may be repeated for however many fans are installed in the exhaust system.

As with the embodiment of FIG. 6, one of the fans may be designated as a redundant fan. The redundant fan is not included in the regular control logic, and is typically used as an emergency back-up. Also, the control system preferably cycles and sequences the fans to rotate which fan is the redundant fan and ensure substantially the same operating hours for each of the fans.

Figure 8:
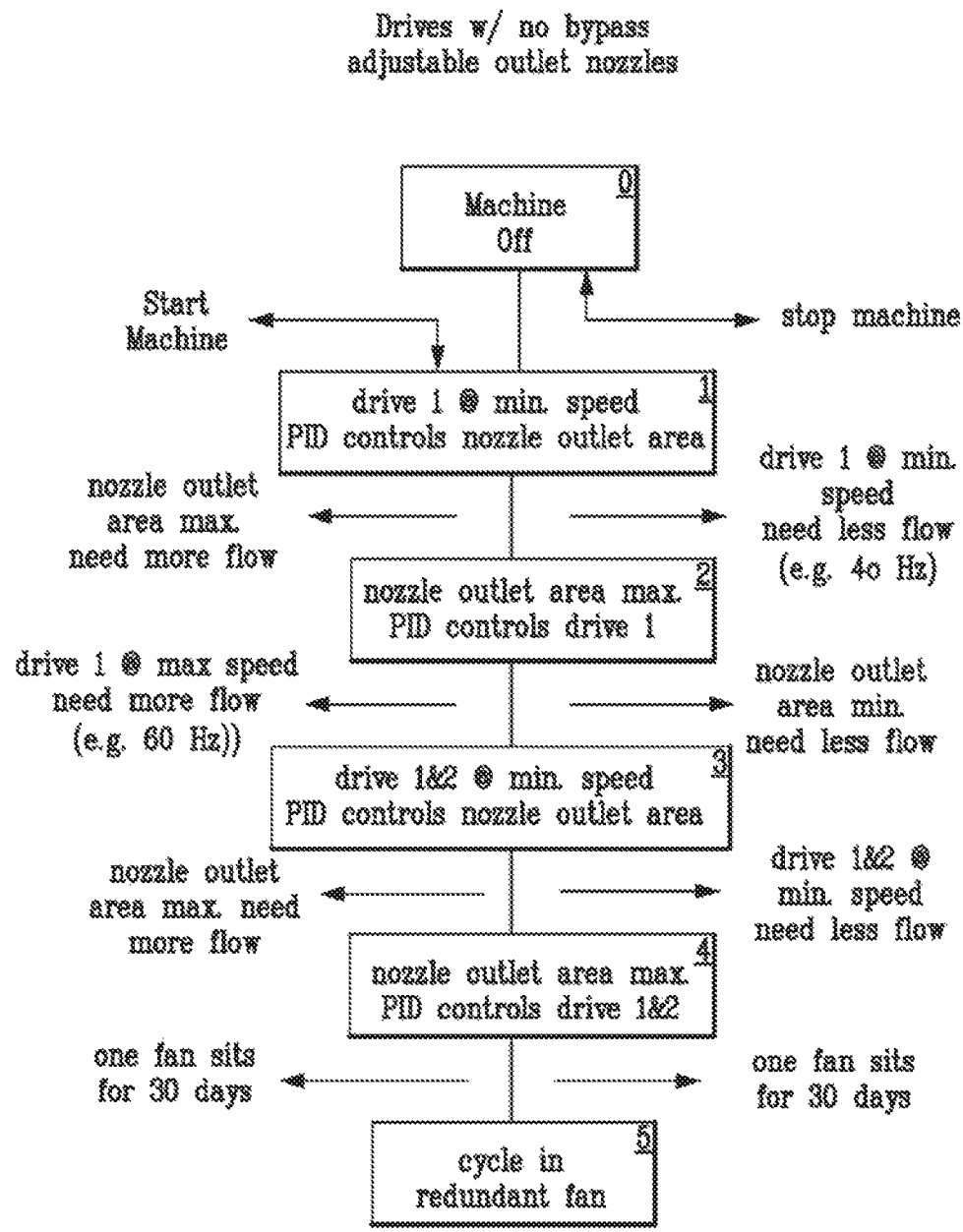
FIG. 8 is flow diagram illustrating the logic of an exemplary control system incorporating variable speed drive and adjustable outlet nozzles into the exhaust fan system.

FIG. 8 is a flow chart illustrating another embodiment of the control system logic. The embodiment of FIG. 8 includes Adjustable Speed Drives (ASD) and adjustable outlet nozzles for optimizing the performance of the exhaust system. This embodiment does not include by-pass dampers. Elimination of the by-pass dampers may result in improved energy efficiencies. As shown in FIG. 8, the control includes start/stop logic. At start-up, a first exhaust fan is energized, the fan speed is set to a pre-set minimum speed, and the adjustable nozzles are positioned to have a pre-set minimum flow through area. Setting the adjustable nozzles to a minimum flow through area helps to ensure sufficient exhaust velocity to avoid re-entrainment of exhaust. The control system controls the position of the adjustable nozzles.

As system demand increases, the control system may respond by sending a signal to an actuator to adjust the position of the nozzles to increase the flow through area. This results in more flow through the exhaust fan. Once the adjustable nozzles reach a pre-set maximum flow through area, and with increasing system demand, the control system may control the fan drive to increase the speed of the exhaust fan.

As shown in FIG. 8, once the fan reaches a pre-set maximum speed, and with increasing system demand, the control system may start a second exhaust fan. The load is balanced between the energized fans and the fan drives (fan drive 1 and fan drive 2) may be set to the pre-set minimum speed. The control system may also set the adjustable nozzles to have a minimum flow through area.

As system demand increases, the control system may respond by adjusting the position of the nozzles to increase the flow through area, resulting in more flow through the exhaust fan. Once the adjustable nozzles reach a pre-set maximum flow through area, and with increasing system demand, the control system may control the fan drives to increase the speed of the exhaust fans. This process may be repeated for as many fans as are available in the exhaust system. A redundant fan and cycling/sequencing logic may also be included.

Figure 9B:
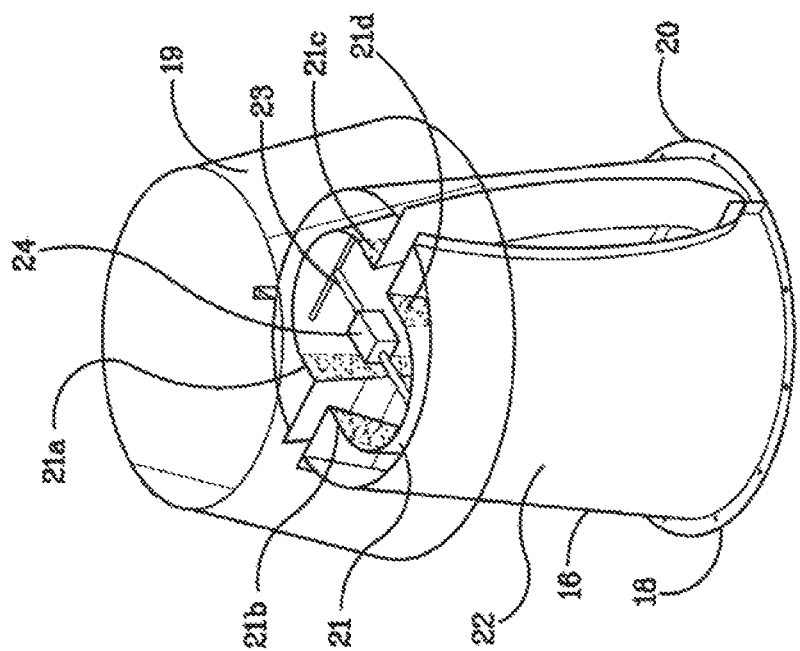
FIGS. 9A and 9B show exemplary adjustable outlet nozzles.
Figure 9A:
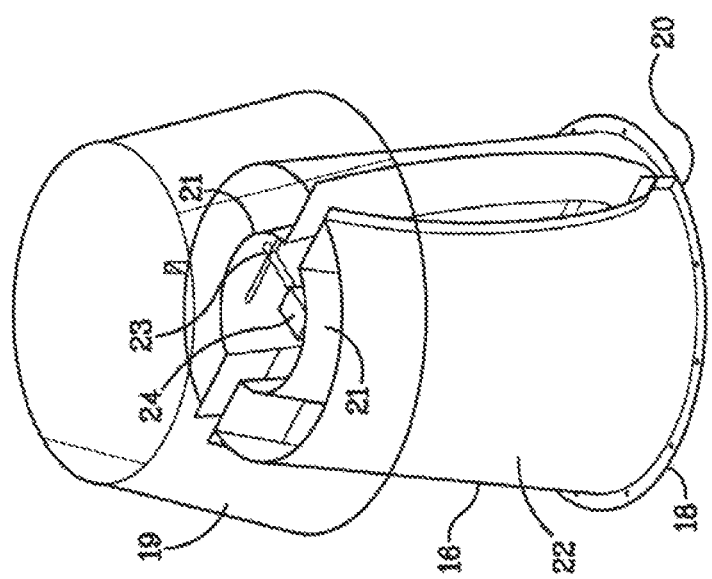

FIGS. 9A and 9B show an exemplary adjustable nozzle. As shown, adjustable nozzle assembly 16 may include two nozzle halves, 18 and 20, each shaped as a partial conical section. Nozzle sections 18 and 20 may be concave toward each other and may be spaced from one another.

As shown, the nozzle sections 18 and 20 each include an inner wall 21 and an outer wall 22. The inner wall 21 has flexible panels 21a, 21b, 21c, 21d which are movable about an axis to change the outlet area (i.e., flow through area) of the outlet nozzle. The flexible panels form the inner walls of each of the nozzle sections. Flexible panels 21a, 21b, 21c, 21d may move in unison as a drive mechanism 24 propels a rod or linkage 23 to change the outlet area of the outlet nozzle. For example, the outlet area is changed from that of FIG. 9A to the smaller area of FIG. 9B, which increases the exhaust velocity.

Adjustable outlet nozzles may be used to improve exhaust system performance by providing a reduced flow through area during periods of low system demand. During periods of low demand, less exhaust air may be going through the fan(s). As a result, the adjustable nozzles may pinch off (reduce the flow through area) and the exhaust air velocity increases. This feature helps maintain the minimum pre-determined discharge velocity.

An adjustable outlet nozzle also provides energy efficiencies. For example, if the outlet nozzle is a fixed nozzle, as the system demand increases and all other parameters are constant, more air will be moving through the outlet nozzle. If the outlet or flow through area of the nozzle is constant, then you are paying for the velocity pressure—i.e., the extra velocity that is not necessary for proper exhaust system performance. An alternative solution may be to open up the adjustable nozzles and use less horsepower to maintain the desired discharge velocity. This reduces energy consumption.

Additional details of the adjustable nozzle assembly may be found in U.S. Provisional patent application Ser. No. 11/958,617, filed Dec. 20 2007 and entitled "Upblast Exhaust Apparatus with a Variable Outlet Nozzle," which is incorporated herein by reference in its entirety.

Figure 10:
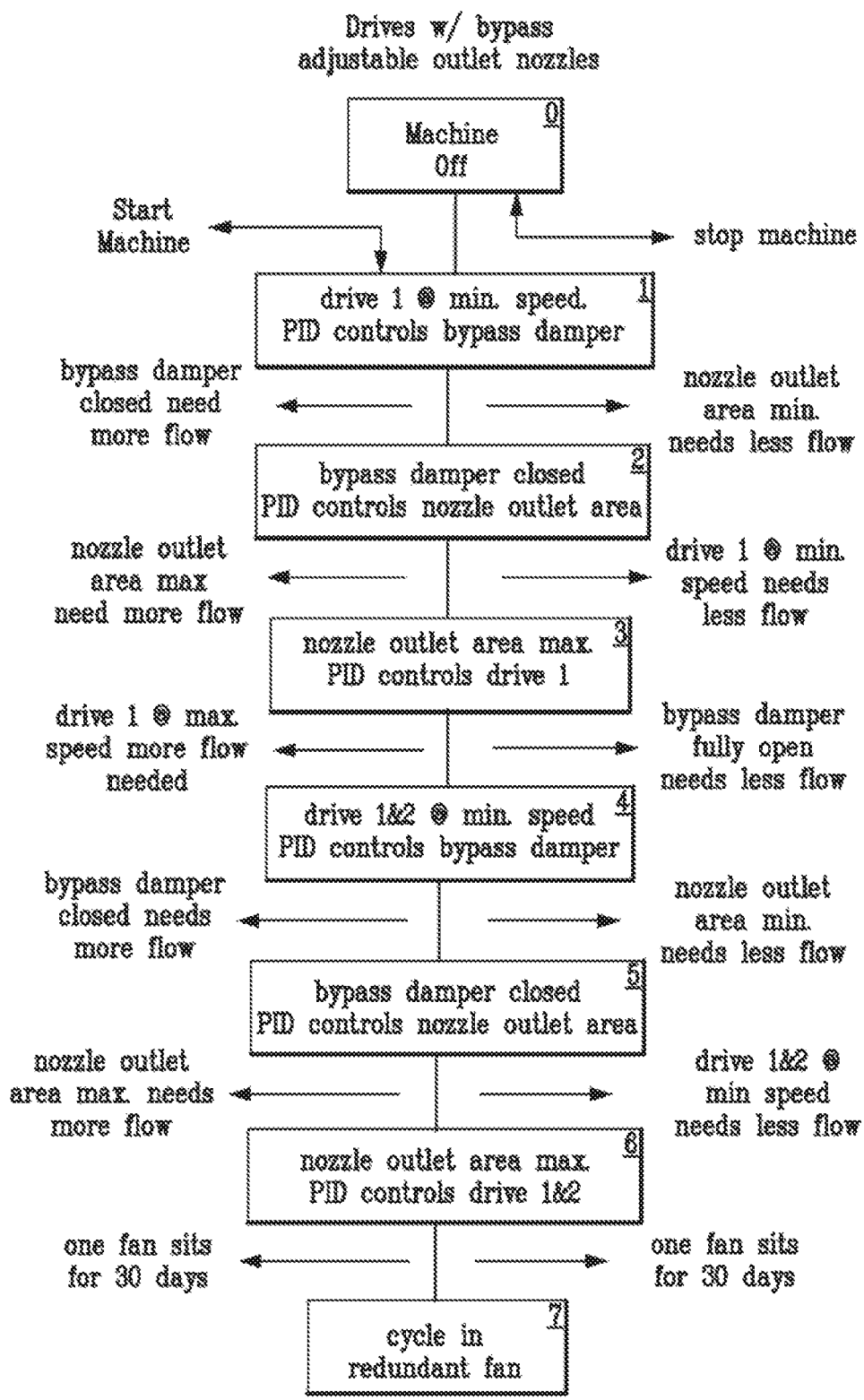
FIG. 10 is flow diagram illustrating the logic of an exemplary control system incorporating variable speed drive, by-pass, and adjustable outlet nozzles into the exhaust fan system.

FIG. 10 is a flow chart illustrating another exemplary control system for controlling a multiple exhaust fan system. The control system works to maintain the static pressure in the system and may control one or more of: modulation of the by-pass dampers, the flow through area of the outlet nozzle, the speed of the exhaust fans, and the number of exhaust fans in operation. As shown in FIG. 10, the control system provides start/stop logic for each exhaust fan in a multiple fan system.

When the building exhaust fan system is placed in operation, a first exhaust fan may be energized and the drive of the first exhaust fan is set at a minimum speed. The other fans may be off or in a stand-by mode. With low system demand, the by-pass dampers may be open and the adjustable nozzles may be set to a minimum flow through area. As hood demand increases, the control system may cause the by-pass dampers to close. As the by-pass dampers approach full closure and/or are closed, and as the exhaust load in the building continues to increase, the exhaust fan need more flow to maintain optimal performance and the control system may adjust the outlet nozzle to increase the flow through area of the outlet nozzle to provide more flow. As the adjustable outlet nozzles approach maximum flow through area and/or are at the maximum flow through area, and as the exhaust demand in the building continues to increase, the exhaust fan need more flow to maintain optimal performance and the control system may send a signal to the fan ASD to increase the speed of the first exhaust fan to provide more flow.

As the first exhaust fan approaches and/or is at a pre-set maximum speed, a second exhaust fan may be started to provide additional flow. With two exhaust fans in operation, less flow per fan may be required and the exhaust fans may be set to a minimum speed, the by-pass dampers may be open, and the adjustable nozzle may be set to a minimum flow through area. As hood demand continues to increases, the control system may cause the by-pass dampers to close thus pulling more exhaust from the building. As the by-pass dampers approach full closure and/or are at full closure, and as the exhaust load in the building continues to increase, more flow is needed and the control system may adjust the position of the outlet nozzle to increase the flow through area. As the adjustable outlet nozzles approach maximum flow through area and/or are at the maximum flow through area, and as the exhaust demand in the building continues to increase, the exhaust fan need more flow to maintain optimal performance and the control system may send a signal to the fan drive to increase the speed of the exhaust fans to provide more flow.

As the first and second exhaust fans approach and/or are at a pre-set maximum speed, a third exhaust fan may be started to provide additional flow. This process may be repeated for as many fans are present in the multiple exhaust fan system.

Figure 11:
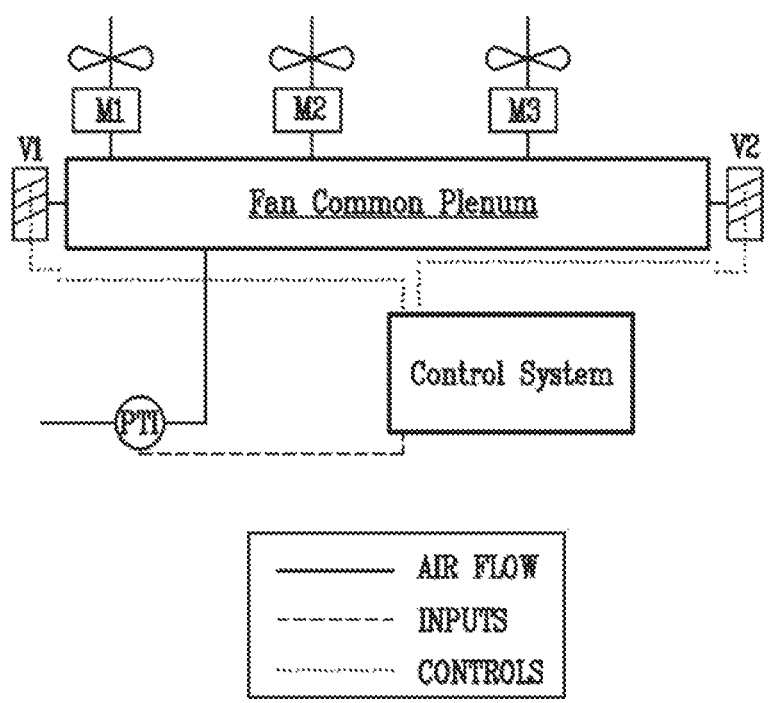
FIG. 11 shows an exemplary exhaust gas fan system having a control system in accordance with an embodiment of the invention for use with a multiple fan system and having a pressure sensor and by-pass dampers.

Embodiments of the control system include:
1. single fan system with by-pass, no ASD, no adjustable nozzles;
2. single fan system with by-pass and adjustable nozzles, no ASD;
3. single fan system with by-pass, adjustable nozzles, and ASD;
4. single fan system with ASD, no by-pass, no adjustable nozzles;
5. single fan system with ASD and adjustable nozzles, no by-pass;
6. single fan system with ASD, adjustable nozzles, and by-pass
7. multiple fan system with ASD and staging of fans, no by-pass, no adjustable nozzles;
8. multiple fan system with ASD, staging of fans, and by-pass, no adjustable nozzles (see FIG. 11);
9. multiple fan system with ASD, staging of fans, and adjustable nozzles, no by-pass; and
10. multiple fan system with ASD, staging of fans, by-pass, and adjustable nozzles.

The control system may include some sort of damping to avoid cycling. This may include a time delay, a set point having a dead band or range, and the like.

The control system may be a self-reliant or independent system serving the exhaust gas fan system only. Alternatively, the control system may be integrated in to the building control system. Also, the control system may be wired to the building emergency exhaust system and may be used to evacuate smoke.

The control system may be housed in an enclosure. Preferably, the location of the controls is such that they are protected from the weather and accidental knocking, yet is convenient to access for maintenance and repair. The enclosure may comprise a stand-alone enclosure, such as a NEMA 4 enclosure. The control system enclosure may be mounted to the structure of the plenum. Alternatively, the control system may be incorporated into the control enclosure of another component of the exhaust system. For example, the control system may be implemented on a card or printed circuit board that may be inserted into the fan controller, the VFD, and the like "PID" depicted in several of the figures stands for Proportional Integral Differential and represents a logic program. The PID program may include a set code that says whatever these conditions are, check out the static pressure, basically balance the system out to try and meet that static pressure inside the duct work.

The exhaust gas fan system may include a modular design and may be delivered as a package that can be dropped into place on the roof of a building. The package may include the mixing plenum, by-pass dampers, fans, motors, adjustable speed drives, discharge nozzles, adjustable nozzles, etc. The modular design may readily allow, for example, the installation/replacement of one or more fans.

The control system for exhaust gas fan systems may be used as a practical, cost-efficient, and energy efficient solution for applications having pollution abatement, re-entrainment, and odor control problems. The control system may be used with new constructions and retrofits. The control system and exhaust gas system may be used for any building or facility, including for example: hospitals; infirmaries; isolation rooms; clean rooms; biomedical facilities; research laboratories; pharmaceutical, chemical, and petrochemical facilities; manufacturing facilities; production facilities; wastewater treatment plants; emergency diesel generator exhaust; or any other facility where 100% make-up air is desired/required.

While the present invention has been described in connection with the exemplary embodiments of the various figures, it is not limited thereto and it is to be understood that other similar embodiments may be used or modifications and additions may be made to the described embodiments for performing the same function of the present invention without deviating therefrom. Therefore, the present invention should not be limited to any single embodiment. Also, the disclosed embodiments should be construed to include other variants and embodiments of the invention, which may be made by those skilled in the art without departing from the true spirit and scope of the present invention.

The invention claimed is:
1. A control system configured to control a fan system that exhausts gas from a building, the building comprising ducting, a mixing plenum in fluid communication with the ducting, at least one by-pass damper supported by the mixing plenum, an exhaust fan supported by the mixing plenum and configured to draw gas through the mixing plenum so as to discharge the gas as exhaust gas through an outlet nozzle, and a variable speed fan drive that operates the exhaust fan at variable speeds, the control system comprising:
- a static pressure probe disposed upstream of the exhaust fan in the ducting, the static pressure probe operable to measure a static pressure of the exhaust gas,
- wherein the control system is configured to cause the at least one by-pass damper to move from an open position toward a closed position as the measured static pressure increases while the exhaust fan is operating at a determined minimum speed, and the control system is configured to cause the variable speed drive to increase a speed of the exhaust fan, when the at least one by-pass damper approaches the closed position or is at the closed position, in response to a further increase in the measured static pressure, and
- wherein the control system is configured to 1) decrease the speed of the exhaust fan in response to a decrease in system demand, and 2) cause the at least one by-pass damper to move toward the open position when the exhaust fan is operating at the determined minimum fan speed in response to a further decrease in system demand, thereby providing supplemental air to the exhaust fan.

2. The control system recited in claim 1, further comprising a plurality of fans configured to draw the exhaust gas from the mixing plenum, and a corresponding plurality of variable speed fan drives associated with the plurality of fans, respectively, wherein the control system is configured to control the variable speed fan drives to operate the respective fans at variable speeds.

3. The control system recited in claim 2, wherein the exhaust fan is a first fan of the plurality of fans, and when the speed of the first fan reaches a determined threshold, the control system energizes a second fan of the plurality of fans.

4. The control system recited in claim 2, wherein when the plurality of fans is energized, the control system controls the speed of the plurality of fans so as to balance a flow rate substantially equally among the energized plurality of fans.

5. The control system recited in claim 3, further comprising a a static pressure probe disposed upstream of the exhaust fan in the mixing plenum, the static pressure probe operable to measure a static pressure of the exhaust gas.

6. The control system recited in claim 5, wherein the control system controls the speed of the plurality of exhaust fans and a position of the at least one bypass damper so as to maintain the measured static pressure substantially constant.

7. The control system recited in claim 1, further comprising a wind band disposed circumferentially and in vertical spaced relation over the outlet nozzle and extending generally upward therefrom.

8. A building exhaust system configured to control a flow of exhaust gas from a building, the exhaust system comprising:
- the ducting;
- the mixing plenum;
- the at least one by-pass damper;
- the exhaust fan; and
- the control system of claim 1,
- wherein the ducting is configured to carry the exhaust gas from at least one exhaust hood to the mixing plenum, the mixing plenum is configured to receive the exhaust gas from the ducting, and the exhaust fan is configured to blow the exhaust gas from the mixing plenum out the outlet nozzle.

9. A method of controlling a flow of exhaust gas from a building, the building comprising ducting, a mixing plenum in fluid communication with the ducting, at least one by-pass damper supported by the mixing plenum, and a first variable speed exhaust fan supported by the mixing plenum configured to draw the exhaust gas through the mixing plenum and out the building, the method comprising the steps of:
- sensing, upstream of the first variable speed exhaust fan, a static pressure of the exhaust gas in the ducting using a static pressure probe;
- operating the first variable speed exhaust fan at a determined minimum fan speed while the at least one by-pass damper is in an open position so as to cause the exhaust gas to exit the building at least at a minimum discharge velocity;
- in response to an increase in system demand, causing the at least one by-pass damper to move from the open position toward a closed position to maintain a substantially constant system pressure set point;
- after the closing step, in response to a further increase in system demand, increasing a speed of the first variable speed exhaust fan as the sensed static pressure further increases, in order to maintain the substantially constant system pressure set point;
- decreasing the speed of the first variable speed exhaust fan in response to a decrease in system demand; and
- causing the at least one by-pass damper to move toward the open position when the first variable speed exhaust fan is operating at the determined minimum fan speed in response to a further decrease in system demand, thereby providing supplemental air to the first variable speed exhaust fan.

10. The method as recited in claim 9, wherein the building further comprises a plurality of variable speed exhaust fans configured to draw the exhaust gas from the mixing plenum, and the method further comprises a step of energizing a second variable speed exhaust fan of the plurality of variable speed exhaust fans when the first variable speed exhaust fan of claim 9 approaches and/or is at a determined threshold.

11. The method as recited in claim 10, further comprising a step of balancing the flow rate substantially equally between the plurality of variable speed exhaust fans.

12. The method as recited in claim 9, wherein the closing step comprises moving the at least one by-pass damper to the closed position.

13. The method as recited in claim 9, further comprising the step of sensing a static pressure of the exhaust gas in the mixing plenum upstream of the variable speed exhaust fan.

14. A control system configured to control a fan system that exhausts gas from a building, the building comprising ducting, a mixing plenum in fluid communication with the ducting, at least one by-pass damper supported by the mixing plenum, an exhaust fan supported by the mixing plenum and configured to draw gas through the mixing plenum so as to discharge the gas as exhaust gas through an outlet nozzle, and a variable speed fan drive that operates the exhaust fan at variable speeds;
the control system comprising:
- a static pressure probe disposed upstream of the exhaust fan in the mixing plenum, the static pressure probe operable to measure a static pressure of the exhaust gas,
- wherein the control system adjusts the variable speed fan drive and modulates the at least one by-pass damper in order to maintain a substantially constant static pressure within the mixing plenum, wherein the control system closes the at least one by-pass damper when the discharge velocity of the exhaust gas is above a minimum and the control system opens the at least one by-pass damper when the discharge velocity of the exhaust gas is below the minimum, wherein the control system is configured to cause the at least one by-pass damper to move from an open position toward a closed position as the measured static pressure increases while the exhaust fan is operating at a determined minimum speed, and the control system is configured to cause the variable speed drive to increase a speed of the exhaust fan when the at least one by-pass damper approaches the closed position or is at the closed position, in response to a further increase in the measured static pressure, and wherein the control system is configured to 1) decrease the speed of the exhaust fan in response to a decrease in system demand, and 2) cause the at least one by-pass damper to move toward the open position when the exhaust fan is operating at the determined minimum fan speed in response to a further decrease in system demand, thereby providing supplemental air to the exhaust fan.

15. The control system recited in claim 14, further comprising a plurality of fans configured to draw the exhaust gas from the mixing plenum, and a corresponding plurality of variable speed fan drives associated with the plurality of fans, respectively, wherein the control system is configured to control the variable speed fan drives to operate the respective fans at variable speeds.

16. The control system recited in claim 15, wherein the exhaust fan is a first fan of the plurality of fans, and when the speed of the first exhaust fan reaches a determined threshold, the control system energizes a second fan of the plurality of variable speed fans.

17. The control system recited in claim 15, wherein when the plurality of fans are energized, the control system controls the speed of the plurality of fans so as to balance a flow rate substantially equally among the energized fans.

18. The control system recited in claim 14, further comprising a a static pressure probe disposed upstream of the exhaust fan in the mixing plenum, the static pressure probe operable to measure a static pressure of the exhaust gas.

19. The control system recited in claim 18, wherein the control system controls the speed of the exhaust fan and a position of the at least one bypass damper so as to maintain the measured static pressure substantially constant.

20. The control system recited in claim 14, further comprising a wind band disposed circumferentially and in vertical spaced relation over the outlet nozzle and extending generally upward therefrom.

21. A building exhaust system configured to control a flow of exhaust gas from a building, the exhaust system comprising: the ducting; the mixing plenum; the at least one by-pass damper; the exhaust fan; and the control system of claim 14, wherein the ducting is configured to carry the exhaust gas from at least one exhaust hood to the mixing plenum, the mixing plenum is configured to receive the exhaust gas from the ducting, and the exhaust fan is configured to blow the exhaust gas from the plenum out the outlet nozzle.

22. A method of controlling a flow of exhaust gas from a building, the building comprising ducting, a mixing plenum in fluid communication with the ducting, at least one by-pass damper supported by the mixing plenum, and a first variable speed exhaust fan supported by the mixing plenum configured to draw the exhaust gas through the mixing plenum and out the building, the method comprising the steps of:

sensing, upstream of the first variable speed exhaust fan, a static pressure of the exhaust gas in the mixing plenum using a static pressure probe;

operating the first variable speed exhaust fan at a determined minimum fan speed while the at least one by-pass damper is in an open position so as to cause the exhaust gas to exit the building at least at a minimum discharge velocity;

causing the at least one by-pass damper to move from the open position toward a closed position in response to an increase in system demand;

after the closing step, increasing a speed of the first variable speed exhaust fan in response to a further increase in system demand;

decreasing the speed of the first variable speed exhaust fan in response to a decrease in system demand; and causing the at least one by-pass damper to move toward the open position when the first variable speed exhaust fan is operating at the determined minimum fan speed in response to a further decrease in system demand, thereby providing supplemental air to the first variable speed exhaust fan.

23. The method as recited in claim 22, wherein the building further comprises a plurality of variable speed exhaust fans configured to draw the exhaust gas from the mixing plenum, and the method further comprises a step of energizing a second variable speed fan of the plurality of variable speed exhaust fans when the first variable speed fan of the plurality of variable speed exhaust fans approaches and/or is at a determined threshold.

24. The method as recited in claim 23, further comprising a step of balancing the flow rate substantially equally between the plurality of variable speed exhaust fans.

25. The method as recited in claim 22, wherein the closing step comprises moving the at least one by-pass damper to the closed position.

26. The method as recited in claim 22, further comprising the step of sensing a static pressure of the exhaust gas in the ducting.

* * * * *